US011773283B2

(12) United States Patent
Fry et al.

(10) Patent No.: US 11,773,283 B2
(45) Date of Patent: Oct. 3, 2023

(54) ADDITIVE MANUFACTURING BREAK AWAY SUPPORT MATERIAL

(71) Applicant: Jabil Inc., St. Petersburg, FL (US)

(72) Inventors: Thomas Fry, St. Petersburg, FL (US); Levi Loesch, St. Petersburg, FL (US); Jack Kadidlo, St. Petersburg, FL (US)

(73) Assignee: Jabil Inc., St. Petersburg, FL (US)

( * ) Notice: Subject to any disclaimer, the term of this patent is extended or adjusted under 35 U.S.C. 154(b) by 0 days.

(21) Appl. No.: 17/723,848

(22) Filed: Apr. 19, 2022

(65) Prior Publication Data

US 2022/0332968 A1 Oct. 20, 2022

Related U.S. Application Data

(60) Provisional application No. 63/176,604, filed on Apr. 19, 2021.

(51) Int. Cl.
| | | |
|---|---|---|
| *B29C 64/40* | (2017.01) | |
| *C09D 125/06* | (2006.01) | |
| *B33Y 70/00* | (2020.01) | |
| *B33Y 10/00* | (2015.01) | |
| *B29C 64/118* | (2017.01) | |
| *B29K 25/00* | (2006.01) | |
| *B29K 67/00* | (2006.01) | |
| *B29K 77/00* | (2006.01) | |

(52) U.S. Cl.
CPC ............ *C09D 125/06* (2013.01); *B29C 64/40* (2017.08); *B33Y 70/00* (2014.12); *B29C 64/118* (2017.08); *B29K 2025/06* (2013.01); *B29K 2067/00* (2013.01); *B29K 2077/00* (2013.01); *B33Y 10/00* (2014.12)

(58) Field of Classification Search
None
See application file for complete search history.

(56) References Cited

U.S. PATENT DOCUMENTS

| | | |
|---|---|---|
| 2,256,148 A | 9/1941 | Lichty |
| 2,286,062 A | 6/1942 | Condo et al. |
| 2,363,044 A | 11/1944 | Clifford |
| 2,583,326 A | 1/1952 | D'Alelio |
| 2,606,891 A | 8/1952 | Rowland |
| 2,769,804 A | 11/1956 | Hanson |
| 3,054,783 A | 9/1962 | Lashua |
| 3,080,348 A | 3/1963 | Lang et al. |
| 3,336,267 A | 8/1967 | Zimmerman et al. |
| 4,572,819 A | 2/1986 | Priddy et al. |
| 4,585,825 A | 4/1986 | Wesselmann |
| 4,666,987 A | 5/1987 | Burmester et al. |
| 5,121,329 A | 6/1992 | Crump |
| 5,503,785 A | 4/1996 | Crump et al. |
| 6,790,403 B1 | 9/2004 | Priedeman, Jr. et al. |
| 7,754,807 B2 | 7/2010 | Priedeman, Jr. et al. |
| 8,822,590 B2 | 9/2014 | Hermes et al. |
| 10,059,053 B2 | 8/2018 | Jaker et al. |
| 10,100,168 B2 | 10/2018 | Bayer et al. |
| 2010/0096072 A1* | 4/2010 | Hopkins ............... B29C 64/40 526/318.6 |
| 2018/0361674 A1 | 12/2018 | Jaker et al. |
| 2020/0018918 A1 | 1/2020 | Clark |

FOREIGN PATENT DOCUMENTS

| | | | |
|---|---|---|---|
| CN | 106189033 A | | 12/2016 |
| CN | 107 033 559 A | * | 8/2017 |
| CN | 107033559 A | | 8/2017 |
| CN | 111 098 468 A | * | 5/2020 |
| CN | 111098468 A | | 5/2020 |
| WO | 2016073409 A1 | | 5/2016 |

OTHER PUBLICATIONS

International Search Report and Written Opinion in co-pending International Application No. PCT/US2022/025037 dated Jul. 7, 2022 (10 pages).
Cray Valley Product Bulletin; SMA® Multi-Functional Resins (16 pages).
Denka TH Polymer datasheet. Last update: May 31, 2016 (1 page).
Denka TX Polymer datasheet. Last update: May 31, 2016 (1 page).
Jones, R.A.L., et al., "The surface composition of miscible polymer blends." Polymer, 1993, vol. 34, No. 1 (4 pages).
Polyscope Xiran® IZ0721M Technical datasheet Version No. 05, 2017 (2 pages).
Polyscope, Xiran® IZ1018M Technical datasheet, Version No. 08, 2017 (2 pages).
Scriptset™ Copolymer Resins, North American Product officer. Solenis LLC. 2015, 150193 (1 page).
Xibond® 120 Datasheet Version Mar. 2019; Xibond® Blend Optimizers. Polyscope Polymers (1 page).

* cited by examiner

*Primary Examiner* — Mohammad M Ameen

(74) *Attorney, Agent, or Firm* — Young Basile Hanlon & MacFarlane, P.C.

(57) ABSTRACT

An additive manufacturing composition useful as a support material for common build materials (e.g., polyamide or polyester) is comprised of a blend of an elastomer toughened styrenic polymer having discreet domains of polymerized conjugate diene dispersed within a styrenic matrix and a vinyl aromatic-maleic anhydride copolymer. The composition may be used as a support material in additive manufacturing methods such as extrusion methods (e.g., fused filament fabrication). The compositions may be tuned to realize the desired adherence to facilitate the desired support while also allowing for the mechanical removal without breakage of the underlying part or residual adhered support material.

13 Claims, No Drawings

ADDITIVE MANUFACTURING BREAK AWAY SUPPORT MATERIAL

FIELD

The invention relates to support material used in additive manufacturing processes such as fused filament fabrication (FFF). In particular, the invention relates to break away support materials for build materials such as polyamides and polyesters.

BACKGROUND OF THE INVENTION

Various additive manufacturing processes, also known as three-dimensional (3D) printing processes, can be used to form three-dimensional objects by fusing or adhering certain materials at particular locations and/or in layers. Material can be joined or solidified under computer control, for example working from a computer-aided design (CAD) model, to create a three-dimensional object, with material, such as liquid molecules, extruded materials including polymers, or powder grains, which can be fused and/or added in various ways including layer-by-layer approaches and print head deposition approaches. Various types of additive manufacturing processes include binder jetting, directed energy deposition, material extrusion, material jetting, powder bed fusion, sheet lamination, vat photopolymerization, and fused filament fabrication.

Fused filament fabrication (FFF) is an additive manufacturing process that employs a continuous filament that may include one or more thermoplastic materials. The filament is dispensed from a coil through a moving, heated extruder printer head, and deposited from the printer head in three dimensions to form the printed object. The printer head moves in two dimensions (e.g., an x-y plane) to deposit one horizontal plane, or layer, of the object being printed at a time. The printer head and/or the object being printed moves in a third dimension (e.g., a z-axis relative to the x-y plane) to begin a subsequent layer that adheres to the previously deposited layer and further described in U.S. Pat. Nos. 5,121,329 and 5,503,785. Because the technique requires melting of a filament and extrusion, the build materials ("build polymer") have been limited to thermoplastic polymers. Typically, the thermoplastic polymers that have been most successfully printed by the FFF method are aliphatic polyamides (e.g., Nylon 6,6) and polyesters such as polylactic acid (PLA).

The FFF method to make complex parts that may have unsupported members require the use of a removable support material ("support polymer") that is extruded from a separate print extrusion nozzle. Typically, the support materials have been comprised of polymers that were dissolved in water such as described in U.S. Pat. Nos. 6,790,403; 7,754,807; 8,822,590; and 10,100,168. In U.S. Pat. No. 5,503,785 an interface layer between the support polymer and build polymer that was water dissolvable was used to allow the breaking away of the support material. More recently, breakaway support materials (polyethersulfone polymer blends and polyphenylene) for supporting particular high temperature build polymers such as polyetherimides and polyetherketones have been described in U.S. Pat. No. 10,059,053 and US Pat. Publ. No. 2020/00189181.

Accordingly, it would be desirable to provide a support material for extrusion additive manufacturing that allows for the support of a variety of build polymers including commonly used polyamides and polyesters avoiding one or more of the complexities and problems of the prior art such as those described above.

SUMMARY OF THE INVENTION

It has been discovered that a break away support material for polyamide and polyester that bonds sufficiently to lend support yet is able to be mechanically removed without damage the underlying part or leaving any substantial residue may be formed by the blending of particular vinyl aromatic-conjugated diene copolymers and vinyl-aromatic-maleic anhydride copolymers. Without being limiting, it is believed that the conjugated diene domains when present in sufficient amount realizes the desired release from the polyamide or polyester build material and the maleic anhydride copolymer realizes a sufficient amount of adherence to adequately support the build material during fabrication.

A first aspect of the invention is an additive manufacturing composition comprised of a blend of polymers comprising an elastomer toughened styrenic polymer having discreet domains of polymerized conjugate diene dispersed within a styrenic matrix and a vinyl aromatic-maleic anhydride copolymer. The additive manufacturing composition may be used in any extrusion based additive manufacturing method such as FFF described above or other extrusion methods involving the heating and melting of a powder or pellet through a nozzle that is controllably deposited on a base and subsequent layers.

A second aspect of the invention is an additive manufactured article comprising at least two layers of the composition of the first aspect fused together.

A third aspect of the invention is a method of forming an additive manufactured object comprising:

heating and extruding the composition of the first aspect through a 3d print extrusion nozzle to form a support extrudate and contemporaneously heating and extruding a build material through a second 3d print extrusion nozzle to form a build extrudate, and, depositing the support extrudate and build extrudate such that multiple layers are controllably deposited and fused forming an additive manufactured article, wherein the support extrudate supports a portion of the build material.

The additive manufacturing composition and method to form additive manufactured articles of this invention are particularly useful as a support material for build materials/polymer such as polyamides (e.g., Nylon 6; Nylon 6,6; Nylon 4,6; Nylon 6,9; Nylon 5,10; Nylon 6,10; Nylon 11; Nylon 6,12 and Nylon 12) and polyesters (e.g., polyethylene terephthalate and polylactide). Further areas of applicability will become apparent from the description provided herein. The description and specific examples in this summary are intended for purposes of illustration only and are not intended to limit the scope of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

The compositions are comprised of an elastomer toughened styrenic polymer having discreet domains of polymerized conjugate diene dispersed within a styrenic matrix blended with a vinyl aromatic-maleic anhydride. Generally, the blended polymers are miscible with each other forming a uniform blend without phase separation (i.e., essentially acts as a single phase).

The thermoplastic polymers toughened with elastomeric domains/particles ("toughened thermoplastic polymers") are comprised of a vinyl aromatic monomer polymerized in the presence of a polymerized conjugated diene (elastomer) dissolved in the aromatic vinyl monomer and any solvent used when polymerizing the aromatic vinyl monomer and comonomer. The vinyl aromatic monomer typically is a monomer of the formula:

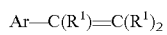

wherein each $R^1$ is independently in each occurrence hydrogen or alkyl or forms a ring with another $R^1$, Ar is phenyl, halophenyl, alkylphenyl, alkylhalophenyl, naphthyl, pyridinyl, or anthracenyl, wherein any alkyl group contains 1 to 6 carbon atoms which may optionally be mono or multi-substituted with functional groups. Such as halo, nitro, amino, hydroxy, cyano, carbonyl and carboxyl. Typically, the vinyl aromatic monomer has less than or equal 20 carbons and a single vinyl group. In one embodiment, Ar is phenyl or alkyl phenyl, and typically is phenyl. Typical vinyl aromatic monomers include styrene (including conditions whereby syndiotactic polystyrene blocks may be produced), alpha-methylstyrene, all isomers of vinyl toluene, especially para-vinyltoluene, all isomers of ethyl styrene, propyl styrene, butyl styrene, vinyl biphenyl, vinyl naphthalene, vinyl anthracene and mixtures thereof. Typically, the vinyl aromatic monomer is styrene. Further examples of vinyl aromatic monomers include those described in U.S. Pat. Nos. 4,666,987; 4,572,819 and 4,585,825, which are herein incorporated by reference.

The vinyl aromatic monomers may be copolymerized with other addition polymerizable monomers such as unsaturated nitriles. Unsaturated nitriles include, but are not limited to, acrylonitrile, methacrylonitrile, ethacrylonitrile, fumaronitrile and mixtures thereof. The unsaturated nitrile may be acrylonitrile. The copolymers may contain an unsaturated nitrile in an amount greater than 0.1 percent by weight of the copolymers or greater, about 1 percent by weight or greater or about 2 percent by weight or greater. The copolymers may contain one or more unsaturated nitriles in an amount of about 40 percent by weight of the copolymers or less, about 35 percent by weight or less, about 30 percent by weight or less or about 20 percent by weight or less. Desirably, however, the thermoplastic polymers toughened with elastomeric domains/particles has a negligible amount of or no further comonomers including the unsaturated nitriles.

The elastomer domains within the styrenic matrix may be any polymerized conjugated diene that phase separates into domains when forming the elastomer toughened styrenic polymer. The elastomer (polymerized conjugate diene) may be cross-linked, grafted with the styrenic matrix polymer, or occluded within the styrenic polymer and still be separated. The cross-linking may arise from cross-linking within and between the chains of the conjugated diene, or cross-links arising between chains of polymerized conjugated diene (e.g., polybutadiene) and the styrenic matrix polymer or combination thereof.

Illustratively, the polymerized conjugated alkene (e.g., diene) that forms the elastomer domains or particles within the styrenic matrix may be any suitable to toughen or forms the separated domains within the styrenic matrix. Generally, the conjugated alkene monomer is of the formula:

wherein each R, independently each occurrence, is hydrogen or alkyl of one to four carbons, where any two R groups may form a ring. Desirably the conjugated alkene is a conjugated diene monomer having at least 4 carbons and no more than about 20 carbons. The conjugated alkene monomer may have 2 or more conjugated double bonds. Examples include, 1,3-butadiene (butadiene), 2-methyl-1,3-butadiene (isoprene), 2-methyl-1,3 pentadiene, and similar compounds, and mixtures thereof. Desirably, the monomer is butadiene, isoprene or combination thereof.

The amount of elastomer in the elastomer toughened styrenic polymer may be any amount useful to make the breakaway support material. Illustratively, when the elastomer toughened styrenic polymer is an ABS (acrylonitrile-butadiene-styrene terpolymer) or HIPS (high impact polystyrene), the amount of the conjugated alkene (e.g., butadiene) typically ranges from about 1%, or 5% to about 40%, 30%, 25%, 20% or 15% by weight of the ABS or HIPS polymer (i.e., not including any other additives such as fillers and the like). Typically, the particle size/domain size of the elastomers within the thermoplastic polymer is from about 0.1 micrometers to about 10 micrometers equivalent spherical diameter, which may be determined by suitable method such as known micrographic techniques.

Examples of the elastomeric toughened styrenic polymer include commercially available HIPS such as those available under the tradenames: STYRON available from Trinseo LLC. (Michigan).

The composition is also comprised of a styrenic-maleic anhydride (SMA) copolymer blended with the elastomeric toughened styrenic polymer. The SMA is a copolymer of vinyl aromatic monomer and maleic anhydride. The vinyl aromatic monomer may be any one of those described above and desirably is styrene. Such SMA polymers are well known and described in U.S. Pat. Nos. 2,286,062; 2,606,891; 2,769,804; and 3,336,267.

The maleic anhydride (MA) is present in an amount that facilitates adequate bonding to the support polymer to realize adequate support during the additive manufacturing process. The amount of MA may be dependent on the particular support polymer (e.g., particular polyamide or polyester). The amount maleic anhydride monomer (MA) typically is at least about 1%, 5%, 10%, 25% to about 85%, 75%, 60% or 50% by mole of the SMA.

The molecular weight and melt flow of the SMA and elastomeric toughened styrenic as well as further polymers that may be added may be any useful for additive manufacturing employing extrusion such as FFF. Typically, the weight average molecular weight may range from about 5,000 or 50,000 g/mole to 1,000,000 g/mole. Typically, the melt flow rate (MFR) may be from about 0.1 to 120 g/10 minutes (230° C./2.16 kg) ASTM D1238. Desirably, the MFR is from about 1, 2 or 5 to 100, 75 or 50 g/10 minutes.

Examples of SMAs that may useful include those commercially available under the tradenames: XIRAN available from Polyscope (Holland), SMA available from Cray Valley USA, LLC. (Pennsylvania) and SCRIPSET available from Solenis LLC. (Delaware).

Generally, the amount of the elastomeric toughened styrenic polymer in the composition is about 25% or 30%, to 40% or 50% by weight of the polymers present in the composition (e.g., the elastic toughened polymer, the SMA and any further polymers). The balance of the composition's polymers may be the SMA alone or with a further polymer as described below. When a further polymer is employed, the amount of SMA may be from about 5%, 10%, 15%, 20% to 45%, 40% or 30% by weight of the polymers present in the composition with the balance being the further polymer.

The composition may be comprised of further polymers to facilitate one or more desired properties. For example, when the support polymer is a polyester such as a polylactide, it may be desirable to add a copolymer of an acrylate and vinyl aromatic monomer, which may include further monomers such as a conjugated diene or unsaturated nitrile as described above. The acrylate and vinyl aromatic copolymer may be desirable to further tune the adherence to a polyester build material. The acrylate monomer may be any suitable such as those known in the art and generally may be represented by:

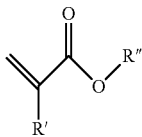

wherein R' is hydrogen or an aliphatic group having 1 to 4 carbons and R" is a linear or cyclic aliphatic group of 1 to 18 carbons or 1 to 12 carbons. Desirably, R' is hydrogen or methyl and R" is a linear aliphatic group of 1 to 4 carbons. Examples of the copolymer of the acrylate and vinyl aromatic polymer include those described by U.S. Pat. Nos. 2,363,044; 3,054,783; and 3,080,348. Examples of useful acrylate-vinyl aromatic copolymers include those known as MS (methylmethacrylate-styrene copolymers), MBS (methyl methacrylate-butadiene-styrene copolymers) and MABS (methyl methacrylate-acrylonitrile-butadiene-styrene copolymers). Such polymers are available under the tradenames: TERLUX available from Ineos (Belgium), TERLUX available from BASF (German); TX Polymer, TH Polymer and TP Polymer available from Denka Company Ltd. (Japan).

The composition may be comprised of other additives such as those known in the polymer and additive manufacturing art such as fillers, plasticizers, lubricants, stabilizers and the like. If a filler is present, generally the filler has a specific surface area of about 0.05 $m^2/g$ to about 120 $m^2/g$, but, desirably, has a specific surface area of 0.1, 0.5, 1, 2 $m^2/g$ to about 50, 25, 20, or 10 $m^2/g$. The filler particles may be individual particles or hard agglomerates such as commonly found in fumed silica and carbon blacks. Desirably, the fillers are individual particles. The amount of filler may vary over a large range relative to the composition. Typically, the amount of filler is from about 1%, 2%, 5%, 10% to 70%, 60%, 50%, 40% or 30% by weight of the composition. The particular amount of filler may also be adjusted to realize one or more desired properties such as stiffness, tensile strength, toughness, heat resistance, color, and clarity of the resulting composition, filament or article formed therefrom.

Generally, the filler may be any shape (e.g., platy, blocky, acicular, whisker spheroidal, chopped fiber or combination thereof). Desirably, the filler has an acicular morphology wherein the aspect ratio is at least 2 to 50, wherein the acicularity means herein that the morphology may be needlelike or platy, but preferably is platy. Needlelike meaning that there are two smaller equivalent dimensions (typically referred to as height and width) and one larger dimension (typically the length). Platy meaning that there are two larger somewhat equivalent dimensions (typically width and length) and one smaller dimension (typically height). More preferably, the aspect ratio is at least 3, 4 or 5 to 25, 20 or 15. The average aspect ratio may be determined by micrographic techniques measuring the longest and shortest dimension of a random representative sample of the particles (e.g., 100 to 200 particles).

The particulate size of the filler needs to be a useful size that is not too large (e.g., spans the smallest dimension of filament or causes the filament to become prone to breaking when bent under conditions usually encountered in additive manufacturing) and not too small that the desired effects on the processability and mechanical properties is not realized. In defining a useful size, the particle size and size distribution is given by the median size (D50), D10, D90 and a maximum size limitation. The size is the equivalent spherical diameter by volume as measured by a laser light scattering method (Rayleigh or Mie with Mie scattering being preferred) using dispersions of the solids in liquids at low solids loading. D10 is the size where 10% of the particles have a smaller size, D50 (median) is the size where 50% of the particles have a smaller size and D90 is the size where 90% of the particles have a smaller size by volume. Generally, the filler has an equivalent spherical diameter median (D50) particle size of 0.1 micrometer to 25 micrometers, D10 of 0.05 to 5 micrometers, D90 of 20 to 60 micrometers and essentially no particles greater than about 100 micrometers or even 50 micrometers and no particles smaller than about 0.01 micrometers. Desirably, the median is 0.5 to 5 or 10 micrometers, the D10 is 0.2 to 2 micrometers and the D90 is 5, 10 or 20 to 40 micrometers.

The filler may be any useful filler such as those known in the art. Examples of the filler include ceramics, metals, carbon (e.g., graphite, carbon black, graphene), polymeric particulates that do not melt or decompose at the printing temperatures (e.g., cross-linked polymeric particulates, vulcanized rubber particulates and the like), plant based fillers (e.g., wood, nutshell, grain and rice hull flours or particles). Exemplary fillers include calcium carbonate, talc, silica, wollastonite, clay, calcium sulfate, mica, inorganic glass (e.g., silica, alumino-silicate, borosilicate, alkali alumino silicate and the like), oxides (e.g., alumina, zirconia, magnesia, silica "quartz", and calcia), carbides (e.g., boron carbide and silicon carbide), nitrides (e.g., silicon nitride, aluminum nitride), combinations of oxynitride, oxycarbides, or combination thereof. In certain embodiments, the filler comprises an acicular filler such as talc, clay minerals, chopped inorganic glass, metal or carbon fibers, mullite, mica, wollastanite or combination thereof. In a particular embodiment, the filler is comprised of talc or carbon fiber.

Any method useful for heating and blending polymers may be employed such as those known for melt blending polymers to form the composition. When heating, typically shear is applied to realize the desired blending. Illustratively the heating and blending may be performed in a single or twin screw extruder such as those known in the art. The amount of shear may be any useful to realize desired distribution of the polymers within the blend as well as any other additives. The extruder may be held at one temperature or have a gradient along the length of the extruder to facilitate the blending and dispersion the polymers.

The compositions may be formed into various forms useful in various 3D printing methods such as fused filament fabrication methods. For example, the composition may be formed into pellets, one or more rods, that can be fed into a fused filament fabrication method to print an object. Such pellets, rods, may be fed into an extruder where the composition is further formed into a filament. The filament can be dimensioned in cross-section shape, diameter, and length for use in various fused filament fabrication methods to print various objects using various print heads. The filament can be formed as it is being used in a printing process or the filament can be pre-formed and stored for later use in a printing process. The filament may be wound upon a spool to aid in storage and dispensing. The filament can be formed in various ways, including various extrusion methods using various dies, such as hot extrusion and cold extrusion methods.

The fused filament fabrication method may employ material extrusion of the composition to print items, where a feedstock of the composition is pushed through an extruder. The filament can be employed within the three-dimensional printing apparatus or system in the form of a filament wound onto a spool. The three-dimensional printing apparatus or system can include a cold end and a hot end. The cold end can draw the filament from the spool, using a gear- or roller-based feeding device to handle the filament and control the feed rate by means of a stepper motor. The cold end can further advance the filament feedstock into the hot end. The hot end can include a heating chamber and a nozzle, where the heating chamber includes a liquefier, which melts the filament to transform it into a thin liquid. This allows the molten composition to exit from a nozzle to form a thin, tacky bead that can adhere to a surface to which it is deposited upon. The nozzle may have any useful diameter and typically depending on resolution desired has a diameter of between 0.1 or 0.2 mm to 3 mm or 2 mm. Different types of nozzles and heating methods are used depending upon the composition, the object to be printed, and the desired resolution of the printing process.

When forming an article by additive manufacturing, the composition of this invention (support material) is extruded through print nozzle depositing one or more layers that support a contemporaneously extruded build material such as those described above (e.g., polyamide or polyester). Once the additive manufactured article is fashioned, the support material may be mechanically removed from the support material to form the final additive manufactured article. If there is any remaining support material, it may be removed by abrasion or by dissolution such as in a alkaline aqueous solution known to dissolve anhydride containing copolymers.

The fused filament fabrication apparatus or system can employ an extruder, where filament is melted and extruded therefrom, in conjunction with a stepper motor and a hot end. The stepper motor can grip the filament, feed the filament to the hot end, which then melts the filament composition and depositing onto the print surface. The fused filament fabrication apparatus or system can employ a direct drive extruder or Bowden extruder. The direct drive extruder can have the stepper motor on the print head itself, where the filament can be pushed directly into the hot end. This configuration has the print head carrying the force of the stepper motor as it moves along the x-axis. The Bowden extruder can have the motor on the frame, away from the print head, and employs a Bowden tube. The motor can feed the filament through the Bowden tube (e.g., a PTFE tube) to the print head. The tube guides the filament from the fixed motor to the moving hot end, protecting the filament from snapping or being stretched by movement of the hot end during the printing process.

The method of printing an object include using the compositions described herein. For example, a filament formed from the composition can be provided and the object can be printed using the filament in a fused filament fabrication process. Providing the filament can include extruding the composition to from the filament. In certain embodiments, extruding the composition can include using one of a direct drive extruder and a Bowden extruder to form the filament.

Articles may be prepared by a fused filament fabrication process as provided herein. Such articles may be prepared by providing a filament formed from a composition as described and printing the object using the filament in a fused filament fabrication process to form an additive manufactured article comprised of at least two layers of the composition of the present invention. The filament may be formed by extruding the composition through a die with or without heating, but typically with heating. Objects produced by three-dimensional printing using such fused filament fabrication processes can be further processed by machining, milling, polishing, coating, painting, plating, deposition, etc.

EXAMPLES

The following non-limiting examples demonstrate further aspects of the present technology. All % are by weight unless otherwise noted.

Examples 1-6

A support material composition is made using 25% SEBS-MAH02520C, graft maleic anhydride (Graft Polymers, Ljubljana, Slovenia) having a maleic anhydride content of about ~2%, 25% styrene-maleic anhydride copolymer (XIBOND120, Polyscope Polymers, Netherlands) having an acid value of about 90 mg KOH/g and 50% HIPs (STYROSOLUTION PS 5601, Songhan Plastic Technology Co. Ltd., China) blended in a twin screw extruder at 200 to 210° C. having a barrel diameter of 27 mm and 40/1 length to diameter ratio. The composition is printed concurrently with differing build materials ABS (acrylonitrile-butadiene-styrene copolymer), PETG (polyethylene terephthalate glycol modified), Nylon 6, Nylon12, SEBS (styrene-ethylene-butylene styrene block copolymer thermoplastic elastomer) and Nylon 12 reinforced with carbon fiber (35%) and are respectively Examples 1-6. Example 7 using PLA as the support material is also made.

Test specimens of the build material in the shape of a C are printed wherein the support material is printed between the upper and lower horizontal portion of the C. Each of the support materials adhered sufficiently and supported the build material without distortion. The support material for each of examples 1-6 is mechanically removed using a 6 inch pick probe without distortion or damage to the underlying support part with no support material residue. The support material in Example 7 did not sufficiently adhere to the build material resulting in warpage of the PLA article and inability form the desired shape due to lack of adhesion.

Example 8

A support material composition of is made using 25% SEBS-MAH02520C (having a maleic anhydride content of about ~2%); 25% XIBOND120 styrene-g-ma having an acid value of about 90 mg KOH/g; STYROSOLUTION PS 5601 25% HIPs and 25% MABS (POLYLAC PA-758, Chi Mei Corporation, China, methyl methacrylate acrylonitrile butadiene styrene copolymer having a MFR 3 g/10 min @ 200° C. at 5 Kg) blended in a twin screw extruder at 200 to 210° C. having a barrel diameter of 27 mm and 40/1 length to diameter ratio. The composition is printed concurrently with PLA build material.

Test specimens of build material are made in the same was as described for Examples 1-7. The support material for Example 8 is mechanically removed using a 6 inch pick probe without distortion or damage to the underlying support part with no support material residue.

What is claimed is:

1. A composition comprising a blend of an elastomer toughened styrenic polymer having discreet domains of polymerized conjugate diene dispersed within a styrenic matrix and a vinyl aromatic-maleic anhydride copolymer, wherein the elastomer toughened styrenic polymer is present in an amount of 25% to 50% by weight of the composition and the vinyl aromatic-maleic anhydride copolymer is present in an amount of 20% to 45% by weight of the composition.

2. The composition of claim 1, wherein the elastomer toughened styrenic polymer is a copolymer of styrene and a conjugated diene and optionally an unsaturated nitrile.

3. The composition of claim 2, wherein the elastomer toughened styrenic polymer is a copolymer of styrene and butadiene.

4. The composition of claim 1, wherein the conjugated diene is present in an amount of about 5% to 15% by weight of the elastomer toughened styrenic polymer.

5. The composition of claim 1, wherein the vinyl aromatic-maleic anhydride copolymer is styrene-maleic anhydride copolymer, a vinyl aromatic block elastomer having maleic anhydride grafted thereto or combination thereof.

6. The composition of claim 5, wherein the vinyl aromatic block elastomer is styrene-(butadiene)-styrene (SBS), styrene-isoprene-styrene (SIS), styrene isoprene butylene styrene (SIBS), styrene-(ethylene-butylene)-styrene (SEBS) or mixture thereof.

7. The composition of claim 6, wherein the vinyl aromatic block elastomer is the SEBS.

8. The composition of claim 1, wherein the vinyl aromatic-maleic anhydride copolymer has a maleic anhydride amount that is about 5% to 50% by weight of the vinyl aromatic-maleic anhydride copolymer.

9. The composition of claim 1, further comprised of a copolymer of an acrylate and a vinyl aromatic monomer.

10. The composition of claim 9, wherein the acrylate-vinyl aromatic copolymer is further comprised of a conjugated diene, unsaturated nitrile or combination thereof.

11. The composition of claim 10, wherein the acrylate-vinyl aromatic copolymer is a copolymer of methyl methacrylate-acrylonitrile-butadiene-styrene (MABS).

12. The composition of claim 1, wherein the composition is a filament.

13. The composition of claim 12, wherein the filament has a diameter of about 1 millimeter to about 3 millimeters.

* * * * *